J. SIMPSON.
Improvement in Celery-Collar.

No. 129,758.  Patented July 23, 1872.

Witnesses:
Chas. J. Nida
C. Sedgwick

Inventor:
J. Simpson
PER Munn & Co
Attorneys.

UNITED STATES PATENT OFFICE.

JOHN SIMPSON, OF YORK, ASSIGNOR TO HIMSELF AND WILLIAM BLAKE, OF LIVERPOOL, ENGLAND.

IMPROVEMENT IN CELERY-COLLARS.

Specification forming part of Letters Patent No. 129,758, dated July 23, 1872.

Specification describing a new and Improved Celery-Collar, invented by JOHN SIMPSON, of York, in the county of York, England.

Figure 1:
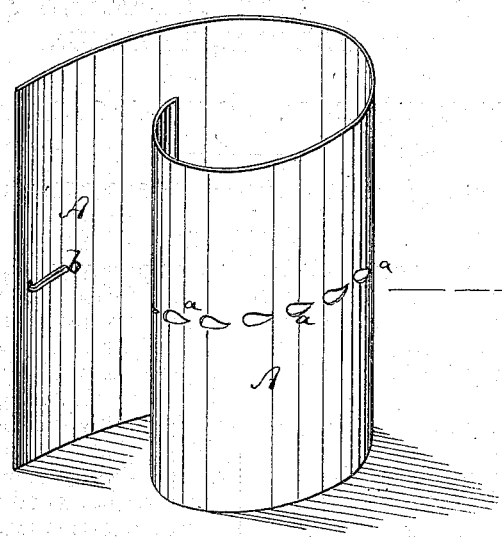
Figure 2:
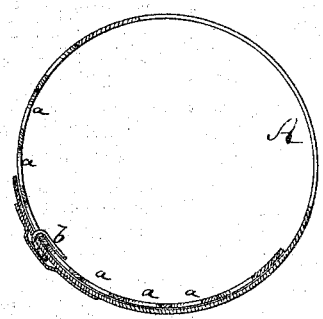

Figure 1 is a perspective view, and Fig. 2 a horizontal section of my improved celery-collar.

Similar letters of reference indicate corresponding parts.

This invention relates to a new shield or collar for use around celery and other plants, with the object of keeping the same from unduly expanding, of bleaching them, and preventing them from becoming soiled. The invention consists in making such a collar of stout paper perforated in a row, and provided at one end with a hook. It is placed around the plant with the hook fitted through one aperture, and allows the plant to become expanded during growth by bearing against the collar and causing the hook to tear its way from the inner gradually to the outer aperture. It always protects the plant and holds its branches properly elevated.

A in the drawing represents the collar, made of a piece of paper or equivalent fabric, of suitable size, and preferably of rectangular form. A row of apertures, $a\,a$, is punched or otherwise formed through it, the spaces between the holes being short to enable the hook to easily tear its way from one aperture to another. $b$ is the hook fastened at one end to the collar so as to project inwardly with its bill. When the hook is put into one of the apertures $a$, as in Fig. 2, the device is in position for use. As the plant which is surrounded by the collar expands it causes the expansion of the collar in exact conformity to its own growth.

These collars are designed as a substitute for the various unhandy contrivances in the shape of hay-ropes, moss, tiles, rags, &c., that are frequently resorted to for protecting celery before earthing up, and are made of stout brown paper that will last for months in the ground, and which may be afterward incorporated with the soil as manure. They prevent the celery from coming in contact with the soil, keep it clean, greatly lessen its liability to rot, protect it from slugs, and secure a better blanched and more compact head, containing a much greater eatable bulk. They are easily and expeditiously fixed and greatly facilitate the earthing-up process, but will also blanch celery effectually without earthing-up, so that the earlier batches that are used before frost sets in need not be soiled-up at all unless desired. They can be made in several sizes, to suit different cultivators, and also to fit plants of any size and thickness. The collars will yield to the plants, as they increase in thickness, by the hook pulling through into the next hole; but it will be found in practice that the paper resists considerable distension, keeps the leaf-stalks firmly in their places, and secures a clean, compact, and well-blanched sample that more than repays the small outlay in collars. They can be sold so cheap as to come within the reach of every grower of celery or other plants to be thus protected.

Having thus described my invention, I claim as new and desire to secure by Letters Patent—

The collar A provided with a series of holes, $a$, and a hook, $b$, substantially as and for the purpose specified.

JOHN SIMPSON.

Witnesses:
CHARLES A. BRAUSON,
JOHN SWIFT.